(12) United States Patent
Owens et al.

(10) Patent No.: US 7,756,763 B1
(45) Date of Patent: *Jul. 13, 2010

(54) METHOD AND APPARATUS FOR PROVIDING A CLEAN ACCOUNTING CLOSE FOR A REAL-TIME BILLING SYSTEM

(75) Inventors: Gary L. Owens, Mountain View, CA (US); David S. Labuda, Half Moon Bay, CA (US); James R. Haddock, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/569,097

(22) Filed: May 10, 2000

Related U.S. Application Data (63) Continuation of application No. 08/856,372, filed on May 14, 1997, now Pat. No. 6,092,055.

(51) Int. Cl.
*G07F 19/00* (2006.01)

(52) U.S. Cl. .............................. 705/34; 705/30; 705/31; 705/33; 705/35; 705/26; 705/27; 705/29; 705/32; 235/379; 235/380

(58) Field of Classification Search ....................... 705/1, 705/14, 30, 26, 27, 34, 40; 379/114; 205/34
See application file for complete search history.

(56) References Cited

U.S. PATENT DOCUMENTS

| | | | |
|---|---|---|---|
| 5,010,485 A | 4/1991 | Bigari | 705/17 |
| 5,163,148 A | 11/1992 | Walls | 707/204 |
| 5,241,670 A | 8/1993 | Eastridge et al. | 714/1 |
| 5,295,256 A | 3/1994 | Bapat | 395/500 |
| 5,517,555 A | 5/1996 | Amadon et al. | 379/114 |
| 5,530,853 A | 6/1996 | Schell et al. | 395/600 |
| 5,613,012 A * | 3/1997 | Hoffman et al. | 382/115 |

(Continued)

FOREIGN PATENT DOCUMENTS

WO    WO 95/04960    2/1995

(Continued)

OTHER PUBLICATIONS

White, Ron, How Computers Work, Millennium Ed. Que Corporation, Sep. 1999.*

(Continued)

*Primary Examiner*—F. Zeender
*Assistant Examiner*—Fawaad Haider
(74) *Attorney, Agent, or Firm*—Townsend and Townsend and Crew, LLP (57) ABSTRACT

A real time billing system for accounts that locks out transaction events when the billing process is underway is provided. When a transaction event is received that should be posted to an account during the billing process, the account is locked. It is determined if the next bill time is in the past for the account and if it is, close billing of the account is performed on the account without billing the transaction event. After close billing of the account is finished, the transaction event may be posted to the account and the account unlocked.

12 Claims, 5 Drawing Sheets

U.S. PATENT DOCUMENTS

| | | | | |
|---|---|---|---|---|
| 5,809,503 | A | | 9/1998 | Aoshima .................. 707/8 |
| 5,832,068 | A | | 11/1998 | Smith .................. 379/114 |
| 5,870,473 | A | * | 2/1999 | Boesch et al. .................. 705/78 |
| 5,875,435 | A | * | 2/1999 | Brown .................. 705/30 |
| 5,884,290 | A | | 3/1999 | Smorodinsky et al. ........ 705/40 |
| 6,047,267 | A | * | 4/2000 | Owens et al. .................. 705/34 |
| 6,047,284 | A | * | 4/2000 | Owens et al. .................. 707/4 |
| 6,092,055 | A | * | 7/2000 | Owens et al. .................. 705/34 |

FOREIGN PATENT DOCUMENTS

| | | |
|---|---|---|
| WO | WO 95/27255 | 10/1995 |
| WO | WO 96/34350 | 10/1996 |
| WO | WO 97/03406 | 1/1997 |
| WO | WO 98/52131 | 11/1998 |

OTHER PUBLICATIONS

Derfler, Frank J. et. al. How Networks Work, Millennium Ed., Que Corporation, Jan. 2000.*

Gralla, Preston, How the Internet Works, Millennium Ed., Que Corporation, Aug. 1999.*

Muller, Nathan J., Desktop Encyclopedia of the Internet, Artech House, Inc., 1998.*

Homgren, Charles T., and Sundem, Gary L., Introduction to Financial Accounting, Revised 3rd Ed., Prentice-Hall, Inc., 1988.*

Riley, David D., Data Abstraction and Stucture, an Introduction to Computer Science II, Boyd and Fraser Publishing Company, 1987.*

Peachtree' Using General Ledger User Guide Peachtree Software, Inc., 1989.*

Borland's Paradox for Windows User's Guide, Borland International, Inc, 1994.*

Gavron, Jacqulyan, et. al., How to Use Micosoft Windows NT 4 Workstation, Macmillian Computer Publishing, USA, 1996.*

Chester, Thomas, and Alden, Richard H.; Mastering Excel 97, 4th Ed., Sybex Inc., Alameda, CA, 1997.*

Regions to Offer Secure Internet Banking From Security First Technologies. PR Newswire, Apr. 1997. p. 0403ATTH003.*

* cited by examiner

METHOD AND APPARATUS FOR PROVIDING A CLEAN ACCOUNTING CLOSE FOR A REAL-TIME BILLING SYSTEM

This is a Continuation of application Ser. No. 08/856,372, filed May 14, 1997, now U.S. Pat. No. 6,092,055 which is hereby incorporated by reference.

BACKGROUND OF THE INVENTION

1. Field of the Invention

The present invention relates generally to methods and apparatuses for providing a clean accounting close for a real time billing system.

More specifically, the invention relates in certain embodiments to methods and apparatuses for preventing transactions that occur after the end of a billing period but before billing has been completed from being included in bills generated by a real time billing system.

2. Description of the Related Art

Real time event rating and billing systems offer important advantages over traditional billing systems. In a traditional billing system, transaction events are time stamped and entered into a database. In order to determine an account balance at a certain point in time it is necessary to search the database and retrieve all of the transaction events that occurred within the time period of interest and compute the account balance based on the transaction events found. A disadvantage of such a system is that real time balances are not kept, that is, a search and calculations are required to determine current balances at any point in time. No running balance total is stored in memory.

Real time event rating and billing systems, on the other hand, keep a running total of balances. It may be useful to have such a running total readily available in memory for several reasons. For example, it may be desirable to authorize transactions in real time based on account balance or apply a rate to a transaction in real time as a function of certain existing balances. Generally, a real time rating system is useful whenever real time account balances are needed.

In most billing systems, bills are generated periodically. Typically, bills are generated for a specific period defined by an opening time and a closing time. It is generally desirable that the close of the billing period be precisely determined and that transaction events outside of the period be excluded from the billing. Generating a clean accounting close is relatively simple for a non-real time system. The definition of the search criteria provides a time cut off that retrieves only transaction events that occur before the close of a billing period. Generating a clean accounting close for a real time event rating and billing system which is continuously adjusting account balances as transaction events occur, on the other hand, presents a more difficult problem. The billing process is not instantaneous and generally takes a finite amount of time to run that in many applications is at least a couple of hours. During that time, if a transaction event occurs, then it may change an account balance before that balance is billed. The transaction would then be improperly recorded since it occurred after the close of the accounting period.

In view of the foregoing, there is a need for methods and apparatuses for providing a clean accounting close for a real time transaction processing system that keeps running balance totals for accounts and does not generate balances using time delimited search criteria.

SUMMARY OF THE INVENTION

Accordingly, the present invention provides an interlock system that locks an account while the account is being billed and then releases the account. When a transaction event occurs during billing, that account is locked and billing for the account is generated immediately. The transaction event is then processed and the account balance is adjusted before the account is unlocked. Subsequent billing for that account during the same period is avoided by checking whether a "last billed" field for the account contains a time that is prior to the closing time for the billing period.

It should be appreciated that the present invention can be implemented in numerous ways, including as a process, an apparatus, a system, a device, a method, or a computer readable medium. Several inventive embodiments of the present invention are described below.

In one embodiment, the invention provides a computer implemented method of performing real time billing of accounts comprising the steps of: during close billing of a billing cycle, receiving a transaction event for an account; locking the account; determining if the account has already been billed in the billing cycle; if the account has not already been billed in the billing cycle, close billing the account without billing the transaction event; posting the transaction event to the account; and unlocking the account. The account may be determined that it has not already been billed by checking if the next bill time of the account is in the past. Typically, the transaction event is a billing event.

In another embodiment, the invention provides a computer implemented real time billing system comprising: a processor; a memory coupled to the processor that stores accounts; a billing process operating on the processor that bills accounts at the end of a billing cycle and upon receiving a transaction event for an account, the billing process locks the account, close bills the account without billing the transaction event if the account has not already been billed in the billing cycle, posts the transaction event to the account, and unlocks the account.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

Reference will now be made in detail to the preferred embodiments of the invention. An example of a preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims along with their full scope of equivalents. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
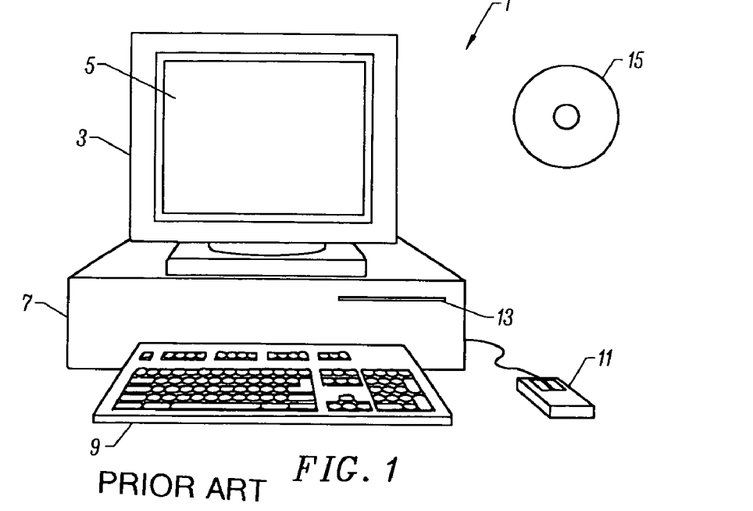
FIG. 1 illustrates an example of a computer system that may be utilized to execute the software of an embodiment of the present invention.

FIG. 1 illustrates an example of a computer system that may be used to execute the software of an embodiment of the present invention. FIG. 1 shows a computer system 1 which includes a display 3, screen 5, cabinet 7, keyboard 9, and mouse 11. Mouse 11 may have one or more buttons for interacting with a graphical user interface. Cabinet 7 houses a CD-ROM drive 13, system memory and a hard drive (see FIG. 2) which may be utilized to store and retrieve software programs incorporating computer code that implements the present invention, data for use with the present invention, and the like. Although the CD-ROM 15 is shown as an exemplary computer readable storage medium, other computer readable storage media including floppy disks, tape, flash memory, system memory, and hard drives may be utilized.

Figure 2:
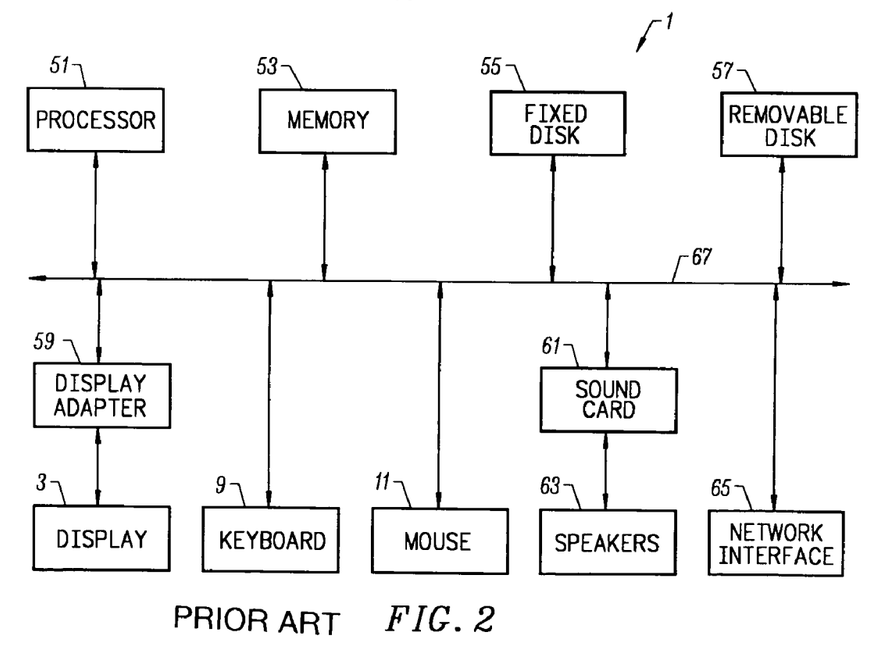
FIG. 2 shows a system block diagram of the computer system of FIG. 1.

FIG. 2 shows a system block diagram of computer system 1 used to execute the software of an embodiment of the present invention. As in FIG. 1, computer system 1 includes monitor 3 and keyboard 9, and mouse 11. Computer system 1 further includes subsystems such as a central processor 51, system memory 53, fixed disk 55 (e.g., hard drive), removable disk 57 (e.g., CD-ROM drive), display adapter 59, sound card 61, speakers 63, and network interface 65. Other computer systems suitable for use with the present invention may include additional or fewer subsystems. For example, another computer system could include more than one processor 51 (i.e., a multi-processor system), or a cache memory.

Arrows such as 67 represent the system bus architecture of computer system 1. However, these arrows are illustrative of any interconnection scheme serving to link the subsystems. For example, a local bus could be utilized to connect the central processor to the system memory and the display adapter. Computer system 1 shown in FIG. 2 is but an example of a computer system suitable for use with the present invention. Other configurations of subsystems suitable for use with the present invention will be readily apparent to one of ordinary skill in the art.

A system for transferring data to and from a transient memory that is organized according to an object-oriented scheme to a persistent memory that is organized according to a relational database management scheme is disclosed in U.S. patent application Ser. No. 08/856,375, filed May 14, 1997, which is herein incorporated by reference for all purposes. Additionally, a system for tracking multiple payment resources and charging transactions to payment resources in an on line transaction processing (OLTP) system is disclosed in U.S. patent application Ser. No. 08/856,313 filed May 14, 1997, which is herein incorporated by reference for all purposes.

Figure 3A:
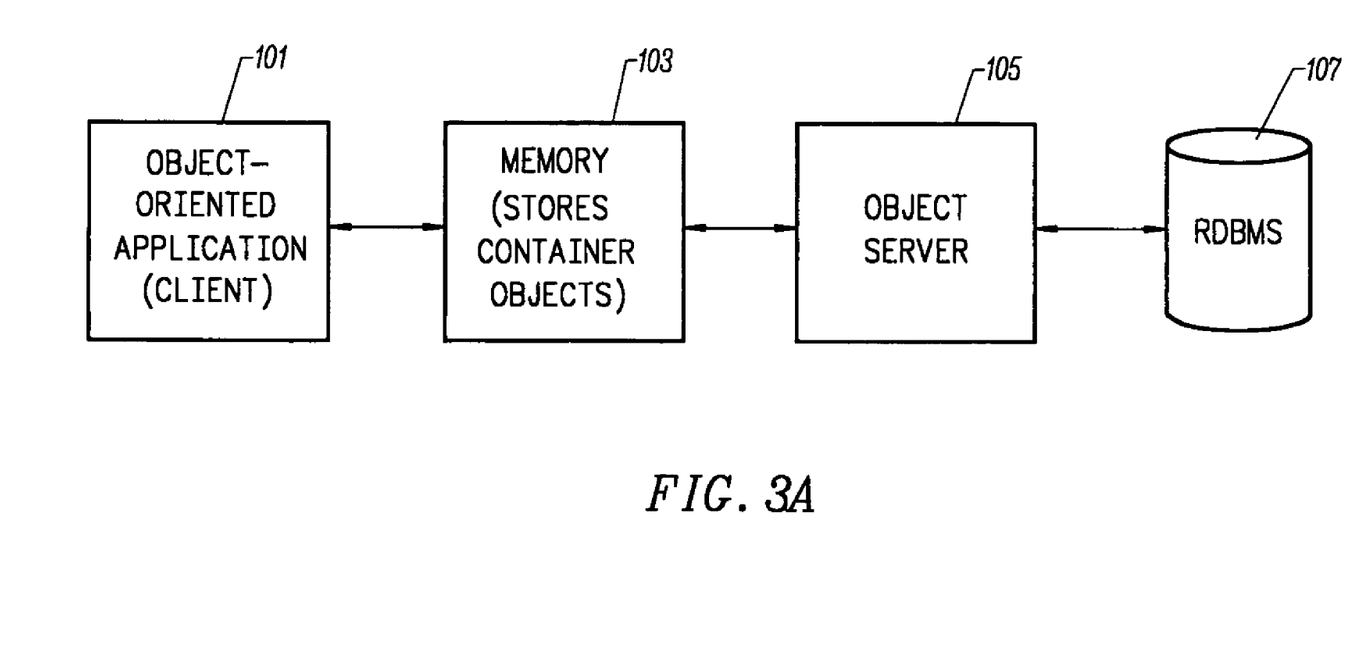
FIG. 3A shows a block diagram of a system architecture for a real time billing system and FIG. 3B illustrates some relational database tables that may be stored for the purpose of storing real time account balance information.

FIG. 3A is a block diagram illustrating a system architecture for a real time billing system. An object-oriented application stores objects in a relational database. An object-oriented application 101 allows object-oriented creation, manipulation, and searching of objects. In traditional client-server nomenclature, application 101 is the client and it typically operates on a computer system. The computer system may be similar to the one shown in FIG. 1.

As objects are created or accessed by application 101, the objects are stored in memory 103. The memory may be generally thought of as transient storage—meaning that the storage is only temporary and is not the permanent storage of the objects. Typically, memory 103 is the dynamic random access memory of the computer system on which the client computer system operates. Of course, memory 103 is not limited to any specific memory-type as it may be cache memory, flash memory, hard drive, floppy disk, and the like.

An object server 105 provides the interface between the object-oriented scheme and the relational database scheme. The object server is a process that translates object-oriented requests into relational database requests (e.g., SQL). Typically the object server operates on the same computer system as the object-oriented application. However, there is no requirement that the object server operate on the same computer system or at the same location (e.g., the two computer systems may be in communication over a network).

The object server sends relational database requests to a relational database management system (RDBMS) 107. The RDBMS stores data in relational tables with columns in the tables representing data of the same type. The RDBMS typically operates on a different computer system than the object server. In traditional client-server nomenclature, RDBMS 107 is the server. In a preferred embodiment, the RDBMS is from Oracle Corporation, Redwood Shores, Calif.

Figure 3B:
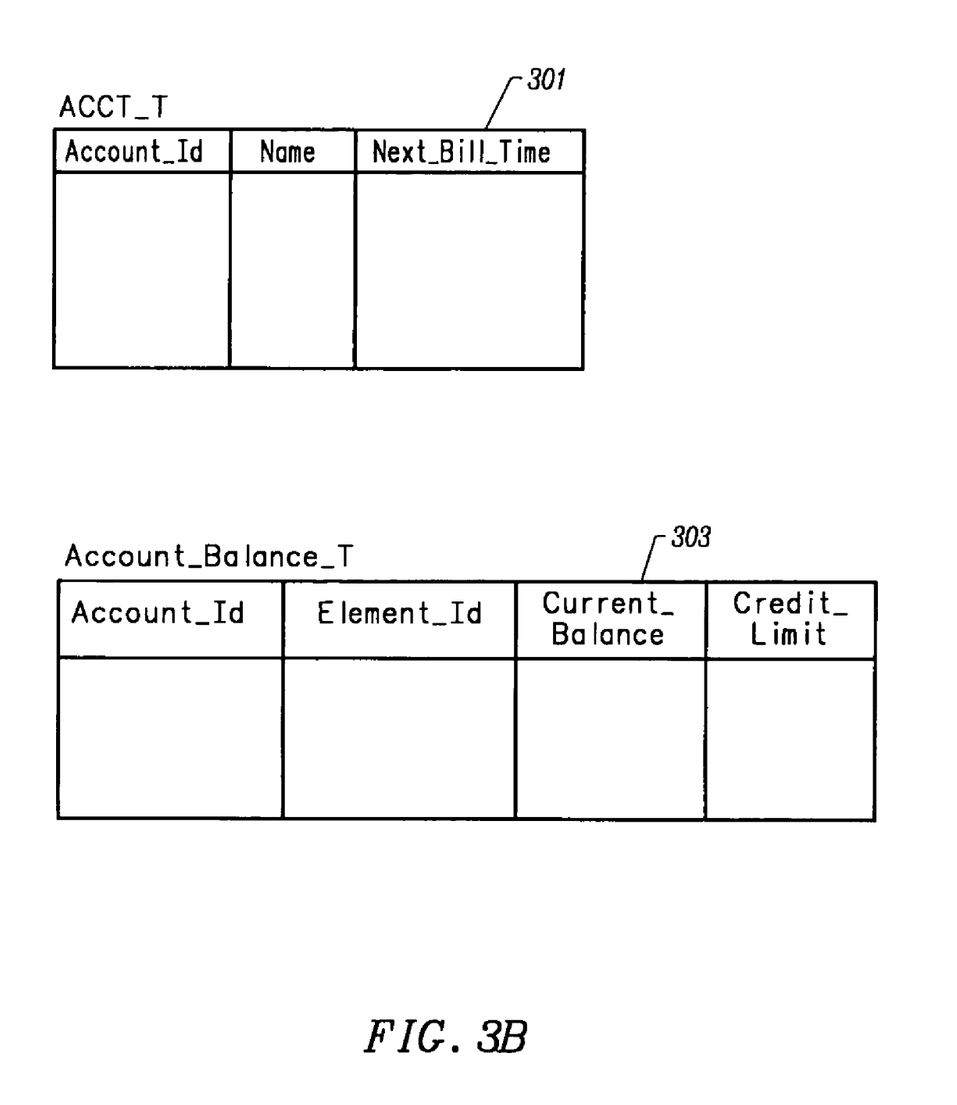

FIG. 3B illustrates some of the tables stored in RDBMS 107 for the purpose of storing real time account balance information. A relational database table (Account_T) 301 is used to store general account information. Table 301 includes an Account_Id column that identifies the account. A Name column identifies the name of the person that the account belongs to and a Next_Bill_Time column lists the time that the account is to be billed next. The use of the "next bill time" in connection with calculating billing at that end of a billing cycle and with a rating operation will be discussed in further detail below. Other fields describing the account are typically included in Account_T as well, and the Name field is shown only for the purpose of an example.

A relational database table (Account_Balance_T) 303 contains information about various account balances. An Account_Id column identifies the account and may be utilized by a RDBMS to join the Account_T and Account_Balance_T tables. An Element_Id column identifies the balance element. A Current_Balance column contains the current balance for each account balance element and a Credit_Limit column stores the credit limit for each account balance element.

Figure 4:
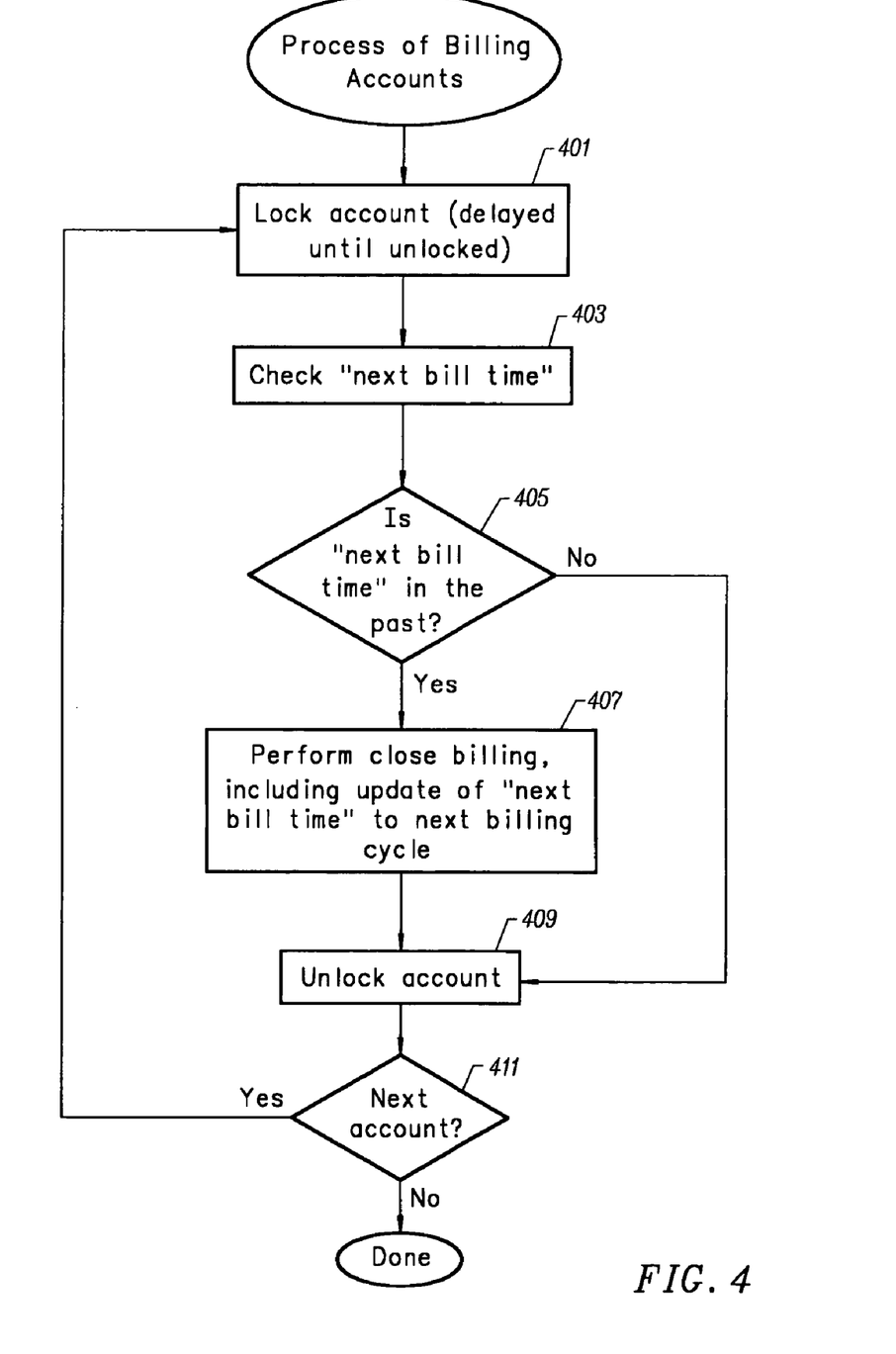
FIG. 4 shows a regular billing process implemented on a computer that sequentially accesses accounts to generate bills for the accounts.

FIG. 4 is a process flow diagram illustrating a regular billing process implemented on a computer system that accesses the account balance information in RDBMS 107 to generate billing for a billing cycle. The process runs sequentially on accounts.

At step 401, an account being processed is locked. Locking the account creates a delay that prevents any of the account balances from being charged as a result of a billing event that occurs while the account is locked. In one embodiment locking the account is accomplished by setting a flag in the Account_T table. Next, at step 403, the Next_Bill_Time column in the Account_T table is checked and determined if it is in the past at step 405. Determining if the next bill time is in the past may include comparing the current time to the next bill time stored in the Account_T table.

If the next bill time is in the past then the system performs a close billing of the account at step 407. Close billing of the account bills the account for any amounts due on the account during the billing cycle and it includes updating or advancing the next bill time in the Account_T table to the next billing cycle. Thus, close billing generates a bill for the account for the billing cycle.

The system unlocks the account at step 409. If, at step 405, it is determined that the next bill time is not in the past, then that is because the billing has already been performed and the next bill time was updated to a future time. In that case, control is transferred directly from step 405 to step 409.

The process of billing accounts typically operates sequentially on the accounts so at step 411 it is determined if there is another account that needs to be processed. If there is, control returns to step 401 and the next account is processed.

A rating operation determines a rate for the billing event and increments the various account balances impacted by the rate. When a transaction event that is billing occurs while accounts are being billed, it is possible that the account impacted by the billing event could be changed before it is closed out and billed. This would prevent a clean accounting close from being achieved. It is also possible that an account could have a billing event occur and have a rating operation occurring at the same time as a bill is being generated for the account. Such an occurrence might produce an unpredictable result. To prevent both of these problems, a special rating operation procedure is implemented. Whenever a billing event occurs, close billing is performed for the account impacted by the event if close billing has not already been performed. This so called event driven billing occurs out of sequence with respect to regular billing.

Figure 5:
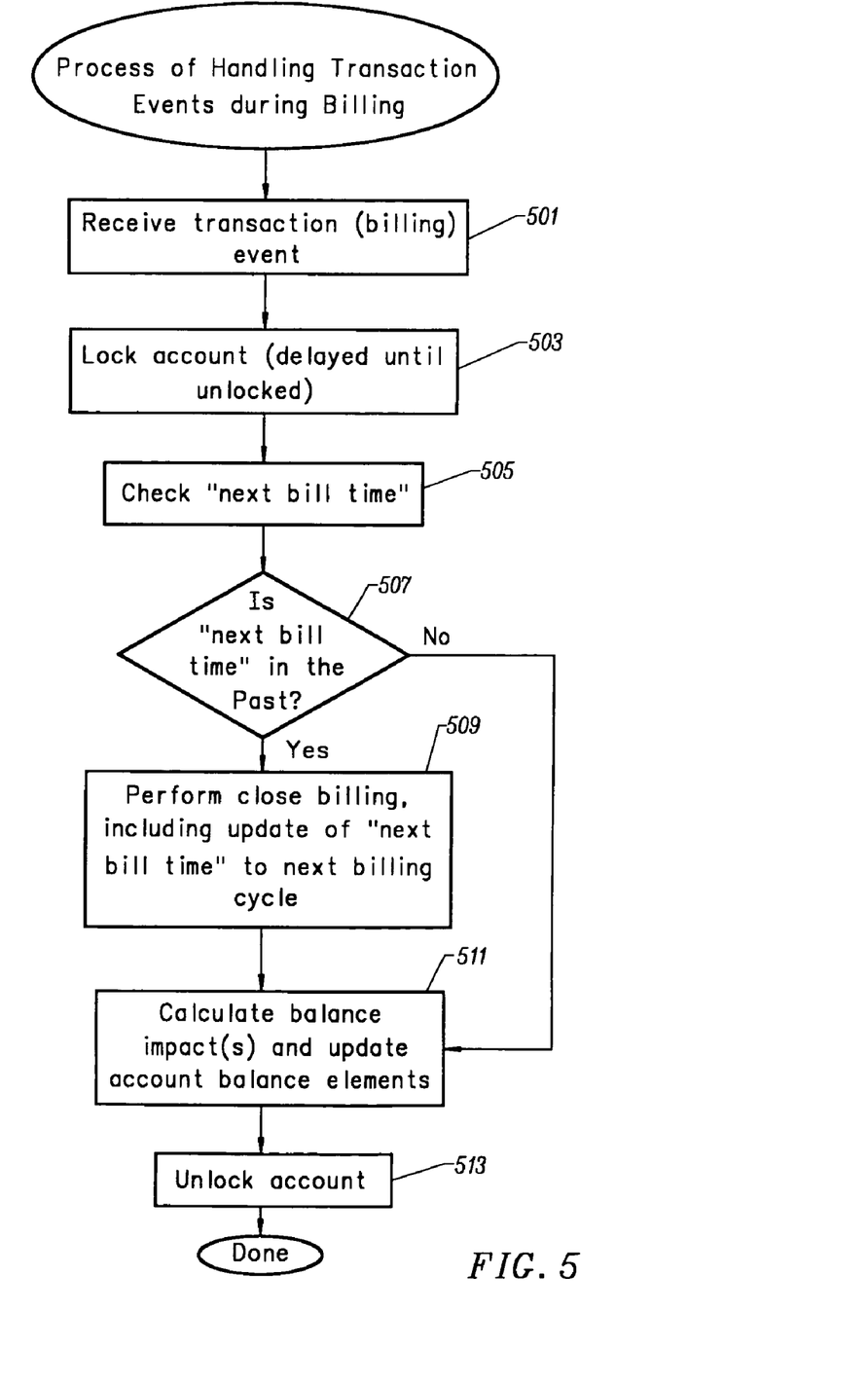
FIG. 5 shows a process that may occur when a billing event occurs while the accounts are being billed.

FIG. 5 is a process flow diagram illustrating the process that occurs when a billing event occurs while the accounts are being billed. At step 501, the system receives a transaction or billing event during the billing process. The account impacted by the billing event is locked at step 503. Locking the account delays the regular billing process shown in FIG. 4 from running on the account while the account is locked. Next, at step 505, the next bill time is checked for the account to determine if it is in the past at step 507. If the next bill time is in the past, then close billing is performed for the account and the next bill time is updated to the time (or date) of the next billing cycle at step 509.

At step 511, the balance impact(s) of the billing event are calculated and the balance elements of the account are updated. Thus, the billing event is posted to the account. If the next bill time is not in the past, then control is transferred directly from step 507 to step 511. At step 513, the account is unlocked.

Thus, when a billing event occurs for an account occurs during a period when close billing is being run for the accounts, the next bill time is checked to determine whether billing has yet occurred for the account. If a bill has not yet been generated for the account, then billing is run immediately before the account balances are incremented. The interlocking feature between the processes shown in FIGS. 4 and 5 prevents regular billing from running on the account when event driven billing is running and vice versa.

The next bill time is analyzed to see if it is in the past in order to determine if an account has already been processed or billed during a close billing. Other mechanisms for determining whether an account has been billed during a close billing may be utilized. For example, a record of the billing cycle where an account was last billed may also be utilized. Accordingly, the invention is not limited to the preferred embodiment described above.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of billing a sequence of accounts at the end of a billing cycle, the method comprising:

initiating a close billing process for the sequence of accounts with a real time billing system;

selecting an account from the sequence of accounts with the real time billing system;

locking the selected account with the real time billing system;

determining with the real time billing system whether billing for the billing cycle has been performed for the selected account;

performing billing with the real time billing system for the selected account if billing for the billing cycle has not been performed for the selected account, wherein billing includes advancing a next bill time of the selected account to a next billing cycle;

unlocking the selected account with the real time billing system;

repeating said selecting an account, locking the account, determining whether billing has been performed for the selected account, performing billing for the selected account, and unlocking the selected account for a next account of the sequence of accounts;

receiving a the real time billing system a transaction event for one of the sequence of accounts other than a currently selected account during the close billing process;

determining with the real time billing system whether the account for which the transaction event is received has already been billed in the billing cycle; and performing billing in real-time with the real time billing system for the account for which the transaction event is received if the account for which the billing event is received has not already been billed in the billing cycle wherein performing billing for the account for which the transaction event is received comprises determining whether the transaction event is received during billing of the account for which the transaction event is received and if the transaction event is not received during billing of the account:

locking the account for which the transaction event is received with a real time billing system;

billing the account for which the transaction event is received with the real time billing system if the account has not been billed for the billing cycle;

processing the transaction event with the real time billing system;

and unlocking the account for which the transaction event is received with the real time billing system.

2. A method as in claim 1, wherein whether the account has been billed for the billing cycle is determined by performing steps of:

checking an indicator that billing has been performed for the billing cycle.

3. A method as in claim 2, wherein the indicator is a next bill time of the account.

4. A method as in claim 1, wherein determining whether billing for the billing cycle has been performed includes checking information associated with the selected account.

5. A method as in claim 4, wherein the information is a next bill time.

6. A method as in claim 1, wherein determining whether the transaction event is received during billing of the account is determined by determining whether the account is locked.

7. A computer-readable medium having stored thereon a series of instructions which, when executed by a computer, cause the computer to bill a sequence of accounts at the end of a billing cycle by:

initiating a close billing process for the sequence of accounts selecting an account from the sequence of accounts;

locking the selected account;

determining whether billing for the billing cycle has been performed for the selected account;

performing billing for the selected account if billing for the billing cycle has not been performed for the selected account, wherein billing includes advancing a next bill time of the selected account to a next billing cycle;

unlocking the selected account;

repeating said selecting an account, locking the account, determining whether billing has been performed for the selected account, performing billing for the selected account, and unlocking the selected account for a next account of the sequence of accounts;

receiving a transaction event for one of the sequence of accounts other than a currently selected account during the close billing process; and determining whether the account for which the transaction event is received has already been billed in the billing cycle; and performing billing in real-time for the account for which the transaction event is received if the account for which the billing event is received has not already been billed in the billing cycle wherein performing billing for the account for which the transaction event is received comprises determining whether the transaction event is received during billing of the account for which the transaction event is received and if the transaction event is not received during billing of the account:

locking the account for which the transaction event is received with a real time billing system;

billing the account for which the transaction event is received with the real time billing system if the account has not been billed for the billing cycle;

processing the transaction event with the real time billing system;

and unlocking the account for which the transaction event is received with the real time billing system.

8. A computer-readable medium as in claim 7, wherein determining whether billing for the billing cycle has been performed includes checking information associated with the selected account.

9. A computer-readable medium as in claim 8, wherein the information is a next bill time.

10. A computer-readable medium as in claim 7, wherein determining whether the transaction event is received during billing of the account is determined by determining whether the account is locked.

11. A computer-readable medium as in claim 7, wherein whether the account has been billed for the billing cycle is determined by performing steps of:

checking an indicator that billing has been performed for the billing cycle.

12. A computer-readable medium as in claim 11, wherein the indicator is a next bill time of the account.

* * * * *

UNITED STATES PATENT AND TRADEMARK OFFICE
CERTIFICATE OF CORRECTION

| | | |
|---|---|---|
| PATENT NO. | : 7,756,763 B1 | Page 1 of 1 |
| APPLICATION NO. | : 09/569097 | |
| DATED | : July 13, 2010 | |
| INVENTOR(S) | : Gary L. Owens et al. | |

It is certified that error appears in the above-identified patent and that said Letters Patent is hereby corrected as shown below:

On page 2, in column 1, under "Other Publications", line 1, delete "et. al." and insert -- et al. --, therefor.

On page 2, in column 2, under "Other Publications", line 7, delete "Stucture," and insert -- Structure, --, therefor.

On page 2, in column 2, under "Other Publications", line 13, delete "et. al.," and insert -- et al., --, therefor.

On page 2, in column 2, under "Other Publications", line 13, delete "Micosoft" and insert -- Microsoft --, therefor.

In column 6, line 43, in claim 1, delete "a the" and insert -- the --, therefor.

In column 7, line 16, in claim 6, delete "by" and insert -- by: --, therefor.

Signed and Sealed this
Third Day of May, 2011

David J. Kappos
*Director of the United States Patent and Trademark Office*